United States Patent
Barnes et al.

(10) Patent No.: US 6,284,344 B1
(45) Date of Patent: Sep. 4, 2001

(54) MULTI-LAYER FILMS

(75) Inventors: Christopher C. E. Barnes; Charles E. Amendt, both of Houston, TX (US); Steven S. Nimz, Lake Tomahawk, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/337,311

(22) Filed: Jun. 21, 1999

(51) Int. Cl.[7] .................................................. B32B 7/00
(52) U.S. Cl. ........................ 428/98; 428/105; 428/195; 428/211; 428/500; 428/515; 428/516; 428/517
(58) Field of Search .............................. 428/98, 195, 211, 428/105, 500, 515, 516, 517

(56) References Cited

U.S. PATENT DOCUMENTS 5,910,353 * 6/1999 Machlica .............................. 428/195

* cited by examiner

*Primary Examiner*—Nasser Ahmad
(74) *Attorney, Agent, or Firm*—Donald J. Breh; Mark W. Croll; John P. O'Brien

(57) ABSTRACT

The present invention is directed to multi-layer films having three or more layers of bias-cut film where at least two layers have different machine direction angles. More specifically, the present invention is directed to cross laminated films with three or more bias-cut film layers each having a machine direction angle between 20° and 70°, where at least two layers have different direction angles.

14 Claims, 4 Drawing Sheets

(1) (2) (3) (4)

(a)

(b)

(c)

(d)

(e)

(f)

(g)

MULTI-LAYER FILMS

FIELD OF THE INVENTION

The invention is directed to multi-layer bias-cut films. More specifically, the present invention is directed to multi-layer bias-cut films that are produced from several layers of monoaxially oriented thermoplastic film that have been bias cut at different bias angles to change the machine direction angle in the film.

BACKGROUND OF THE INVENTION

The present invention is an improvement to a multi-layer film having two layers or four layers of bias-cut film cut at the same bias angle. A process is presently used to produce or manufacture a two layer cross laminated film from monoaxially oriented thermoplastic film. The process cuts the original monoaxially (machine direction) thermoplastic film on a ±45° bias to produce a film with the machine direction of the original film oriented to a ±45° angle, or as used herein "the machine direction angle". Two films having the machine direction angle of 45° are then laminated to produce the two layer cross-laminated film with the machine direction angles of ±45° crossing one another. It is understood that when the machine direction angle is used herein it has reference to the machine direction of the originally produced film that has been redirected or oriented by the bias cutting of the monoaxially thermoplastic film in a direction, dependant on the angle of the bias cutting, at an angle across the bias-cut film.

The equipment used in the process of the two or four layer cross laminated film is disclosed in the section entitled Prior Art Process herein.

SUMMARY OF THE INVENTION

The present invention is directed to multi-layer films having three or more layers of bias-cut film where at least two layers have different machine direction angles. More specifically, the present invention is directed to cross laminated films with three or more bias-cut film layers each having a machine direction angle between 20° and 70°, where at least two layers have different machine direction angles.

DESCRIPTION OF PRIOR ART AND THE PREFERRED EMBODIMENTS OF THE PRESENT INVENTION

The present invention is an improvement to a multi-layer film having two or four layers of bias-cut film that are cross laminated The present invention uses generally the same apparatus and process used to produce or manufacture the multi-layer cross laminated film of the prior art.

Prior Art Process

Figure 1:
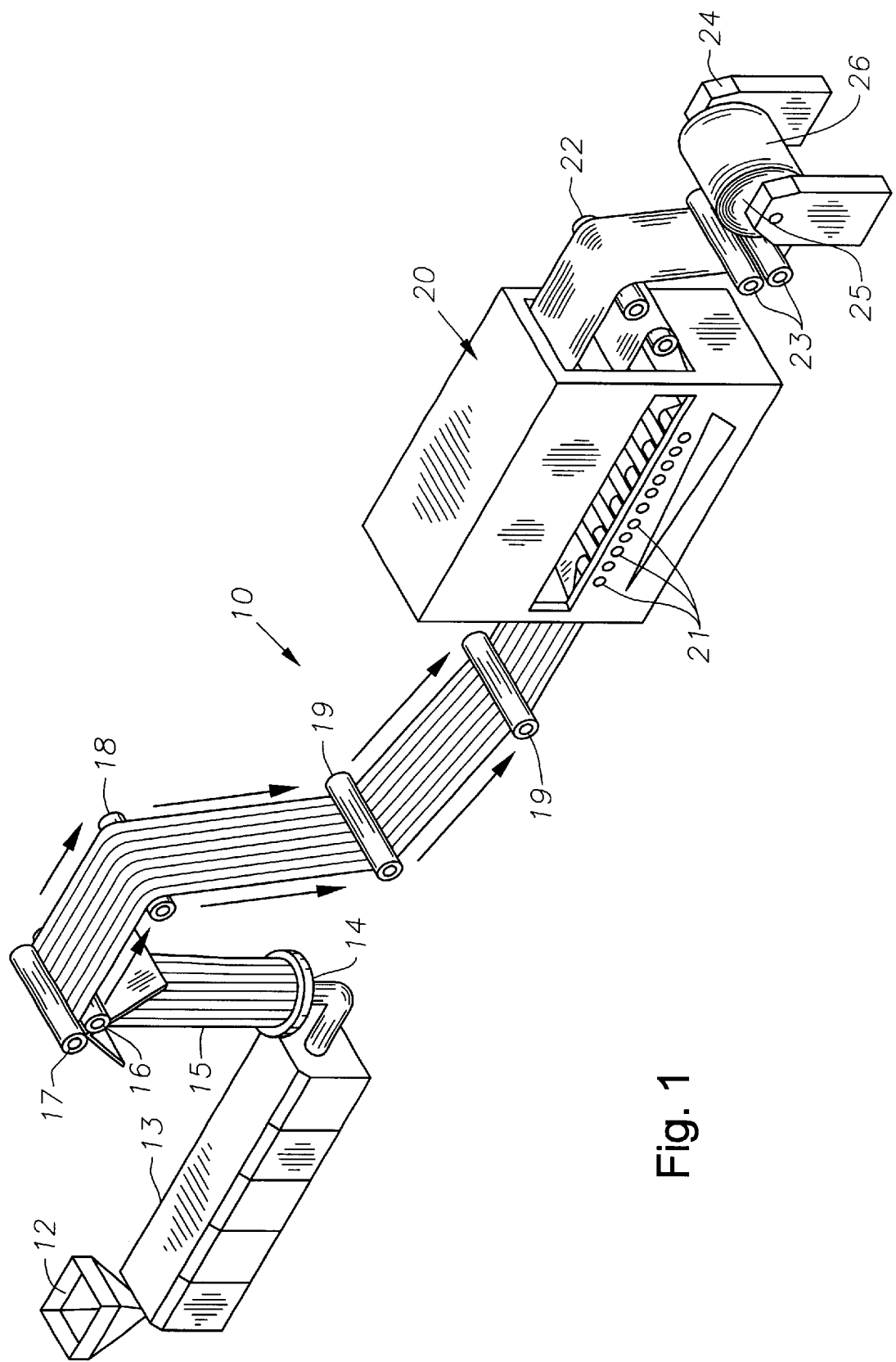
FIG. 1 is an isometric view of the prior art thermoplastic film making process.
Figure 2:
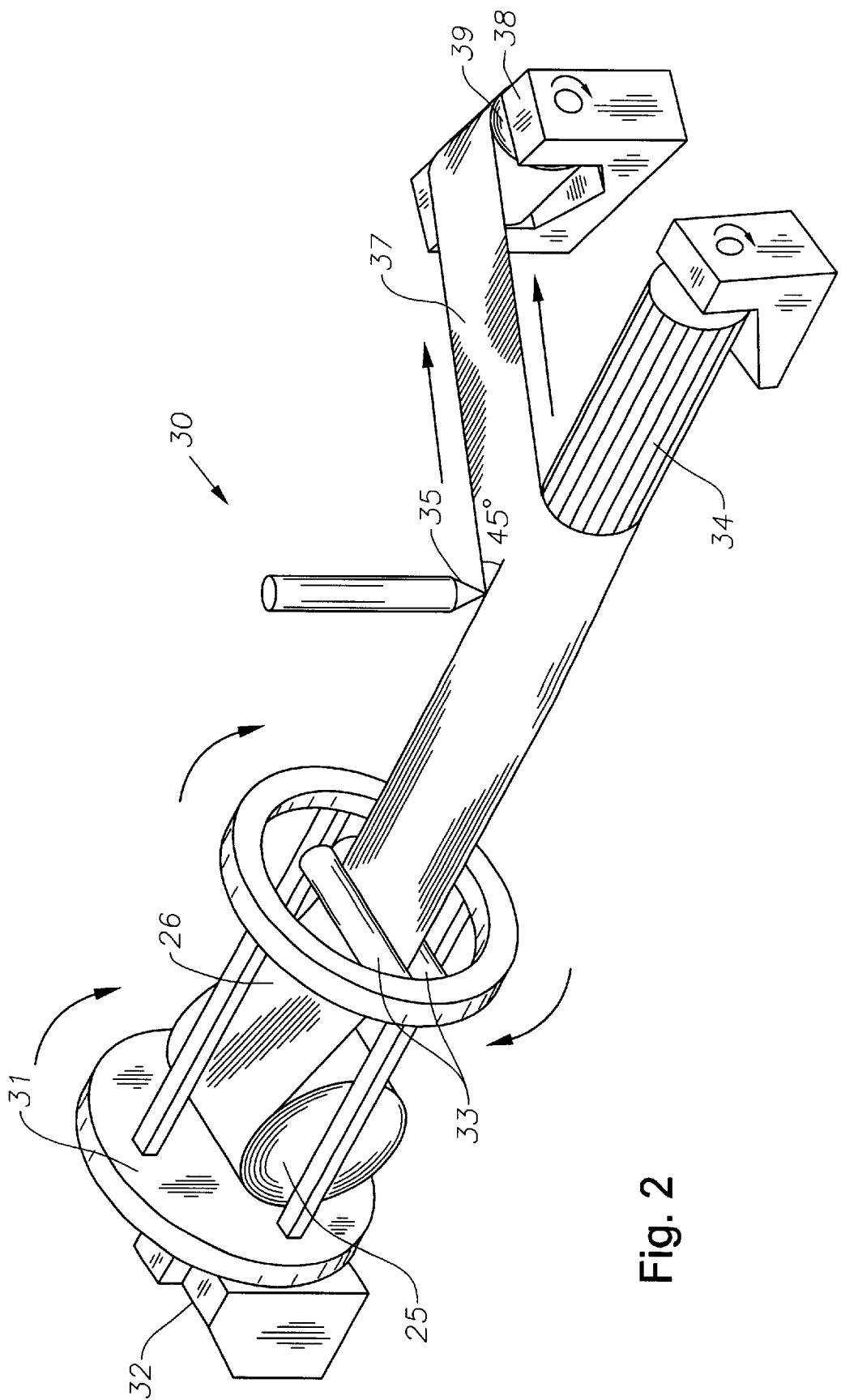
FIG. 2 is an isometric view of the prior art bias cutting process.
Figure 3:
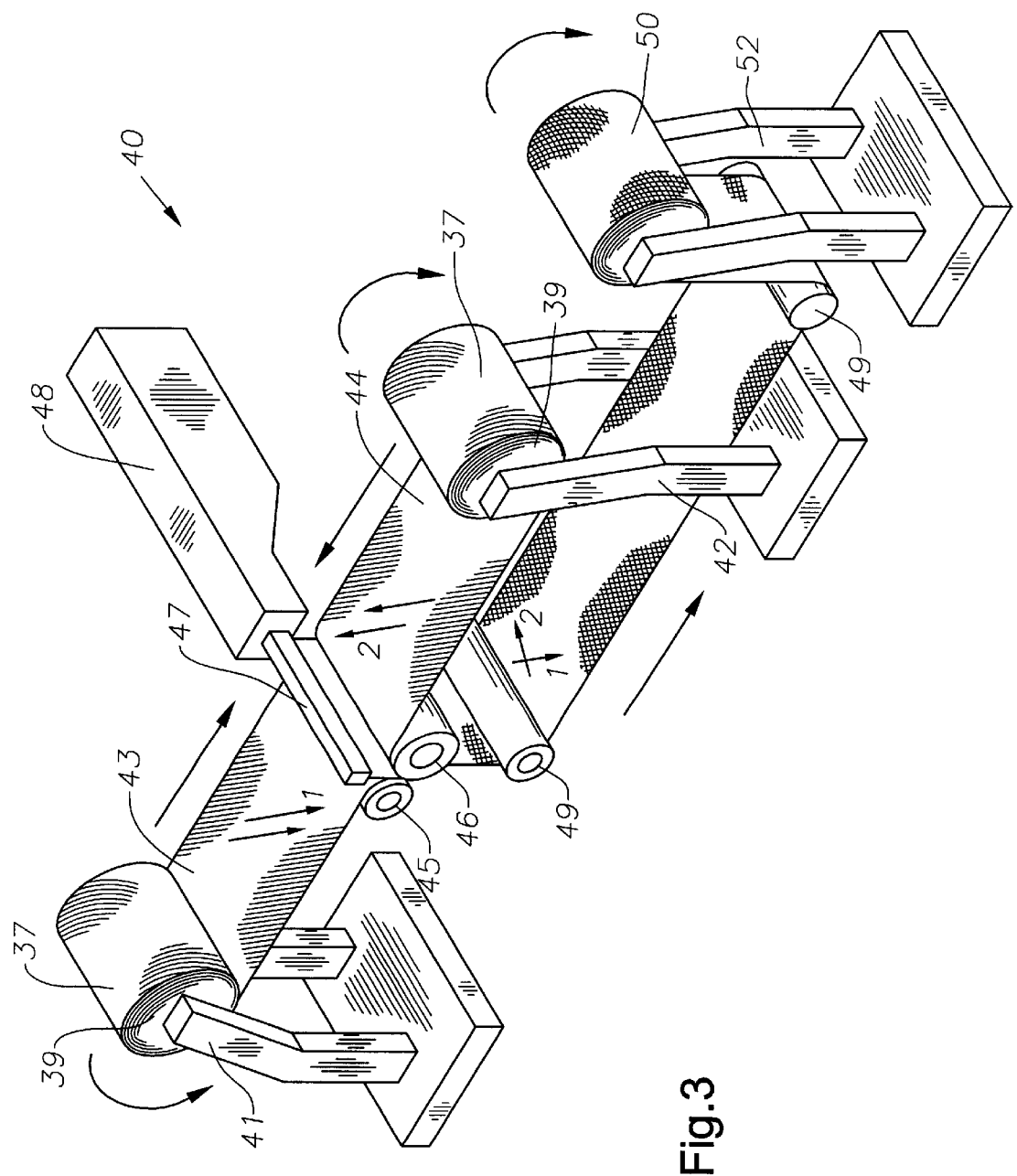
FIG. 3 is an isometric view of the prior art lamination of oriented single plies process.

The multi-layer film of the prior art is manufactured or produced in essentially a three step process. Referring to FIG. 1, step one is to produce a roll of monoaxially oriented film. Step two, referring to FIG. 2, is to bias cut the film so that the original machine direction is redirected or oriented at an angle to the edge of the bias-cut film (machine direction angle). Step three, referring to FIG. 3, is to laminate two single bias-cut ply of film to produce a cross laminated multi-layer film.

Referring to FIG. 1, the film making apparatus 10 is shown. More specifically, a thermoplastic film grade resin is introduced into a hopper 12 of an extruder 13 and forced through a die 14. The die 14 is preferably circular and a stream of gas, usually air, is blown inside the circle of extruded plastic forming a bubble 15 of the thermoplastic. The bubble 15, which is blown vertically upward, cools before reaching the rollers 16 and 17 which collapse the cylindrical bubble into a two layer but circumferentially continuous film. The film is drawn substanially horizontally from the rollers 16 and 17 and over a roller 18. The film then passes under one or more rollers 19 before being passed to a stretching and annealing process section 20. The film is stretched by a series of stretching rollers 21 each drawing the film in the axial direction or machine direction of the film. Preferably, the film is then annealed by passing the film through an annealing oven at the top of section 20. The film exits section 20 over a roller 22 and between drive rollers 23 onto a single ply tube winder 24. A roll 25 of the film 26 is collected on winder 24 and when the desired amount is collected, the roll 25 is removed from the winder 24.

Figure 4:
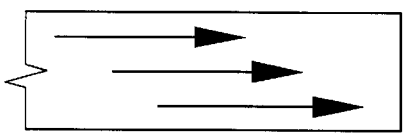
FIG. 4 is a top view of the prior art film showing the machine direction before being cut.

The machine orientation of the film 26 or the original film as it is wound on the roll 25 is monoaxial to the machine direction throughout the process for making the film, as shown in FIG. 4. It is understood that the film 26 being wound on the tube winder 24 is not a single thickness of the thermoplastic but is a collapsed tube or cylinder; therefore, it is referred to as a single ply tube or tube of film.

Figure 5:
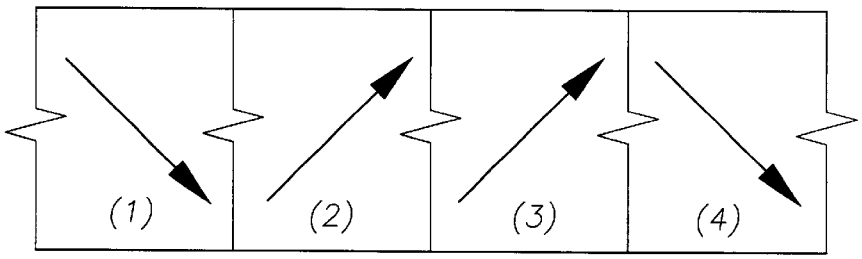
FIG. 5 is a top view of a multi-layer film produced using four-layers of bias-cut film of the prior art with the machine direction angles of each layer (1), (2), (3), and (4) of the films being the same.

Referring to FIG. 2, the bias cutting apparatus 30 is shown. A roll 25 of single ply tube of monoaxially oriented film 26 is inserted into rotating device 31 driven by a motor 32 which rotates and unwinds the collapsed tube of film 26. Rollers 33 draw the tube of film 26 from the rotating roll 25. The tube of film 26 is opened with air and pushed over a rotating horn or mandrel 34. The horn or mandrel 34 has a separate motor and support 35 for rotation of the horn 34. The tube of original film 26 is then cut on the bias with a knife 35 at an angle of ±45°. In the prior art process, the variance was about 2°. The film 37 is drawn to a winder 38 having an independent drive motor to collect a roll 39 of film 37. The film 37 is a single ply, no longer a tube but a single sheet or ply, that has a machine direction angle of ±45° as shown in FIG. 5 (a) or (b).

Referring to FIG. 3, the apparatus 40 for producing a cross layer lamininated film is shown. A roll 39 of film 37 is placed on roll unwinder 41 and a second roll 39 of film 37 is placed on roll unwinder 42 as ply 43 and 44, respectively, are unwound toward each other, each ply having the same machine direction angle as shown on the film. The two ply 43 and 44 move through the nip between a pressure roller 45 and a chill roller 46. Directly above the nip between rollers 45 and 46 is an extruder die 47 which extrudes a laminant, preferably when ply 43 and 44 are polyethylene, the extrudant is a mixture of polyethylenes. An extruder 48 continuously feeds the die 47 with laminant. The laminant is extruded between ply 43 and 44 to form a thin layer before passing between pressure roller 45 and chill roller 46 where the laminant is instantly cooled. Rollers 49 change the vertical direction of the cross layer laminated film 50 to a winder 52. As shown on the cross laminated film 50 between roller 49 and winder 52, the machine direction angles of the two individual bias-cut films are crossed.

As illustrated in FIG. 3, two rolls of film 37, ply 43 and 44, each having the same machine direction angle, are unwound toward each other and laminated. In doing so, the machine direction angles, even though the same in the two sheets, are crossed to one another. It is this crossing of orientation angles which is referred to herein as cross laminating or producing a cross laminated multi-layer film. It is emphasized that only one machine direction angle film is used in the prior art. As part of the prior art, two cross laminted two-layer bias-cut films have been further laminated to produce a four bias-cut layer film. As shown in FIG. 5, the respective layers of bias-cut film have the same machine direction angle as illustrated. These bias-cut films have the cross laminated feature but because the same machine direction angle in each of the bias-cut film is used, two bias-cut layers have the machine direction angle in one direction and the other two bias-cut layers have the same machine direction angle in cross orientation.

PRESENT INVENTION AND PREFERRED EMBODIMENTS OF PRESENT INVENTION

In summary the present invention may use all the general equipment of the prior art. However, what is not evident from the prior art process is that to produce multi-layer films using films having different machine direction angles that the process and equipment must be modified to produce the same desired width of film. At certain widths even different sized equipment must be used in making the film. Attention is directed to the bias cutting step illustrated in FIG. 2, when film 26 is cut at an angle less than 45° a wider film is produced as compared to the film cut at a 45° angle on the same roll 25 of film 26 and likewise, when film 26 is cut at an angle greater than 45° a narrower film is produced. This result of different widths poses an obstacle to efficient production when the films cut at different angles are to be laminated since the two films used to produce the cross-laminated film will not have a uniform width. When it is clear that changing the machine direction angle changes the width of film 37 from the same roll 25 of film 26, it is understood that unifomity is imposed on the prior art process; namely, that all steps in the process are and must be maintained under strict uniform operating specifications to have an efficient process.

The present invention requires more than choosing desired machine direction angles in the film. The selection of desired machine direction angles may be a starting point in the production of multi-layer film having three or more bias-cut layers wherein at least two layers have different machine direction angles. However, the availability of different sized equipment may be another starting point to set the parameters of the selection of machine direction angles that may be employed to produce a multi-layer film having three or more layers wherein at least two bias-cut layers have different machine direction angles. Starting with either approach, the the process and possibly the equipment has significantly different parameters when producing two different films having significantly different machine direction angles. The additional parameters are directed to assure obtaining a desired width in the two films to be combined in a multilayer film product.

The present invention preferrably uses an extruder 13 and die(s) 13 that can produce rolls of monoaxially oriented film 26 that have different circumferances. This change in the extruder 13 may be sufficient to obtain different circumferences of the bubbles 15 to produce a desired width in the bias cutting section 30. On the other hand, it may require that at least two lines are needed to produce rolls of monoaxially oriented film, one producing a smaller circumference roll 25 of film 26 than the other. It follows that if two film making apparatus 10 are used, two stretching and annealing sections 20, rollers and winding machine will be required to handle the respective widths of the film produced. In the bias cutting section of apparatus, a single horn or mandrel 34 can not be used but horns 34 will be required of different diameter or adjustable to different diameters to handle the differing circumferences of the films produced in the film making apparatus 10.

In the process of the present invention a number of thermoplastic films may be produced. The preferred thermoplastics are polyolefins and specifically, polyethylene and polypropylene.

The process of lamination is shown as extruding a laminate into the nip of two sheets and this is the preferred method. The preferred laminate with a polyethylene bias-cut film is a mixture of high and low density polyethylene which will form a layer in the multi-layer film but since the laminant layer is not bias-cut is a layer having no machine direction angle since the machine direction is monoaxially oriented. It is noted that when a laminate is extruded to laminate the bias-cut films that another layer of film is added to the multi-layer film product. Therefore, when two bias-cut films are laminated with an extruded laminate, a three layer film product is produced. However, lamination is used herein to include any method of forming a bond between the bias-cut films and includes such processes as heat sealing or welding which do not necessarily add another layer to the multi-layer product. These are known processes that use heated rods or rollers either along the edges of the films or at random spots across the width of the films. The lamination process may also use adhesives between the films. Whatever process is used, a multi-layer product is produced.

The uniqueness of the multilayer films of the present invention are illustrated in the following examples:

EXAMPLE 1

A polyethylene resin is introduced into the hopper 12 of an extruder 13 and melt blown into a bubble 15. The film bubble is collapsed and formed into a single ply tube which is stretched and annealed. A roll 25 of uniaxial oriented film tube is collected as a roll 25. Maintaining the same conditions, i.e. extruder conditions, bubble size, speed of rollers in the stretching and annealing section and winder, a second roll 25 of uniaxial oriented film tube is collected.

Figure 6:
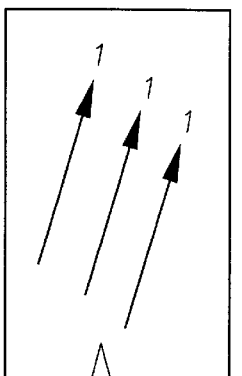
FIG. 6 is a top view of of two films (a) and (b) having one machine direction angle cross laminated into a film (c), two films (d) and (e) having a different machine direction angle than films (a) and (b) cross laminated into a film (f), and then the two layer films (c) and (f) laminated to produce the multi-layer film (g) of the present invention.
Figure 6:
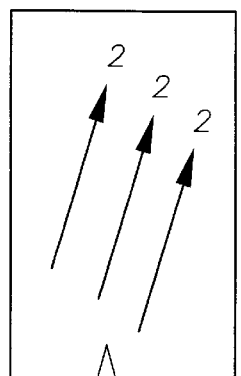
Figure 6:
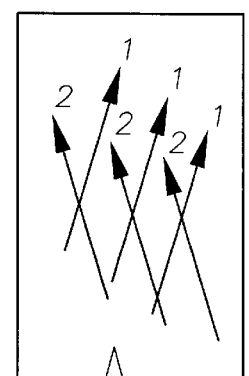
Figure 6:
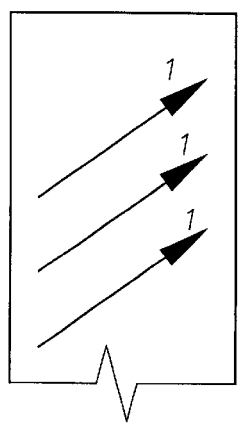
Figure 6:
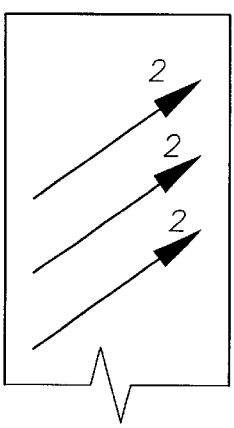
Figure 6:
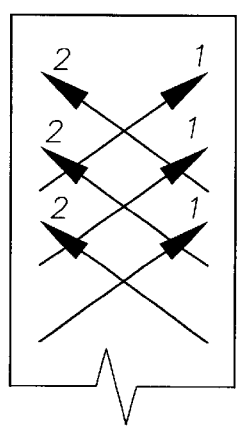
Figure 6:
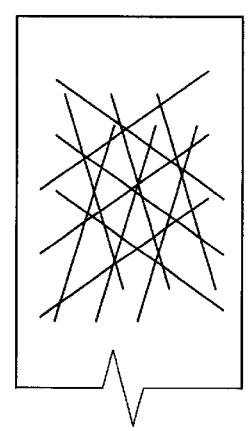

Each roll 25 of polyethylene film tube is placed into the rotating device 31 and unwound and moved onto a horn 34 which is also rotating. A knife 35 cuts each roll of the film 25 at a bias angle of ±40° and produces two rolls of bias-cut film 37 which is wound and collected on winder 38. The nominal width of the film produced is 59". The two rolls 39 of bias-cut film 37 having a machine direction angle of ±40°, (a) and (b) as illustrated in FIG. 6, are placed on unwinders 41 and 42 in a direction as shown in FIG. 3 and a cross laminated film is produced as illustrated in FIG. 6 (c).

The foregoing process is repeated to produce two rolls 39 of film 37 except that a bigger bubble is used in the film making step and a bias angle of the knife 35 is ±53°. The nominal width of the film produced is 59". The two rolls 39 of bias-cut film 37 having a machine direction angle of ±53°, (d) and (e) as illustrated in FIG. 6, are placed on unwinders 41 and 42 in a direction as shown in FIG. 3 and a cross laminated film is produced as illustrated in FIG. 6 (f).

The cross laminated three layer films (c) and (f) are placed in the unwinders 41 and 42 and cross laminted into a seven layer with four bias-cut film layers in the multilayer film (g). The direction angles are not shown since a roll of film having a machine direction angle of ±53° may be cross laminated with a roll of film having a machine direction angle of ±40° and thus the orientation of the specific machine direction angles of the multi-layer film product is a matter of choise.

The use of ± with the bias angle or the machine direction angle means a tolerance of ±2°. Similarly, the use of nominal width is within a tolerance of minimum scrap.

The most significant physical property which is enhanced by the present invention is tear resistance. It is known that uniaxial orinented film is extremely weak to tear in the machine direction. This property was enhanced by the prior art cross laminated products described above. However, tear resistance was enhanced multiple fold in the films of the present invention.

EXAMPLE 2

Following the procedures of Example 1, four bias-cut films having machine direction angles of ±46°, ±43°, ±48° and ±56°, respectively, are produced. Selecting two bias-cut films, a cross laminated film is produced. A second cross laminated film is produced with the two remaining bias-cut films. The two cross laminated films are then laminated. The seven layer cross laminated film has every bias-cut ply with a different machine direction angle. In producing a multi-layer film with different machine direction angles, it is preferred to have a difference between machine direction angles of 3° and 50°, however, this is not meant to be limiting. This product has exceptional tear strength and may be useful as a banner or flag which was impossible with prior art films.

As illustrated, there are many variations that are possible and all are considered within the present invention as set forth in the following claims.

What is claimed is:

1. A multi-layer film comprising:
    at least three bias-cutlayers of a thermoplastic film, where at least two bias-cut layers have different machine direction angles.

2. A multi-layer film according to claim 1 wherein said thermoplastic is a polyolefin.

3. A multi-layer film according to claim 2 wherein said polyolefin is polyethylene.

4. A multi-layer film which comprises:
    at least three bias cut thermoplastic films each having a different machine direction angle.

5. A multi-layer film according to claim 4 wherein said machine direction angles differ between 3° and 50°.

6. A multi-layer film according to claim 4 wherein said machine direction angles are selected between 20° and 70°.

7. A multi-layer film according to claim 4 wherein there are four sheets of bias-cut polyolefin film, two having a machine direction angles of ±40° and two having a machine direction angles of ±53°.

8. A multi-layer film according to claim 4 where at least four bias-cut layers have different machine orientation angles.

9. A multi-layer film according to claim 4 wherein there are four bias-cut sheets of polyolefin film, each layer having a different machine direction angle.

10. A multi-layer film according to claim 9 where the layers having the smallest difference in machine direction angle are not adjacent.

11. A multi-layer cross laminated film which comprises:
    at least three bias cut thermoplastic films each having a machine orientation angle, where at least two layers have different machine direction angles.

12. A multi-layer cross laminated film according to claim 11 wherein said machine direction angles are between 20° and 70°.

13. A multi-layer cross laminated film according to claim 11 wherein there are four sheets of bias-cut polyolefin film, two having a machine direction angle of ±40° and two having a machine direction angle of ±53°.

14. A multi-layer cross laminated film according to claim 11 wherein said thermoplastic is a polyethylene.

* * * * *